United States Patent [19]

King

[11] Patent Number: 4,912,981

[45] Date of Patent: Apr. 3, 1990

[54] SENSOR PROTECTION FOR A COMPRESSED AIR TANK

[75] Inventor: James A. King, Schofield, Wis.

[73] Assignee: J. I. Case Company, Racine, Wis.

[21] Appl. No.: 306,610

[22] Filed: Feb. 6, 1989

[51] Int. Cl.$^4$ ................................................ G01L 9/00
[52] U.S. Cl. .................................... 73/706; 73/753; 73/756
[58] Field of Search ................ 73/706, 708, 753, 754, 73/756; 340/614, 626

[56] References Cited

U.S. PATENT DOCUMENTS 4,806,913  2/1989  Schmidt .............................. 340/626

FOREIGN PATENT DOCUMENTS 0471127  3/1952  Italy ..................................... 73/706

Primary Examiner—Donald O. Woodiel
Attorney, Agent, or Firm—Dykema Gossett

[57] ABSTRACT

A sensor assembly and a protection device for use in conjunction with an air pressure tank. The sensor assembly consists of sensors that each act to give a visual indication when the pressure within the air pressure tank exceeds a preselected actuating pressure for the individual sensor. By observing the status of the sensors, an operator can quickly arrive at an approximation of the pressure within the air pressure tank. The sensor protection comprises a vapor separation unit that is disposed on the line that connects the air pressure tank to the sensor assembly. This protection unit acts to remove any vapor or fluids from the compressed air before it will reach the sensor unit. Due to the nature of the sensor units utilized, if the vapor or fluid were to reach the sensor units, it could clog them and prevent their operation.

4 Claims, 1 Drawing Sheet

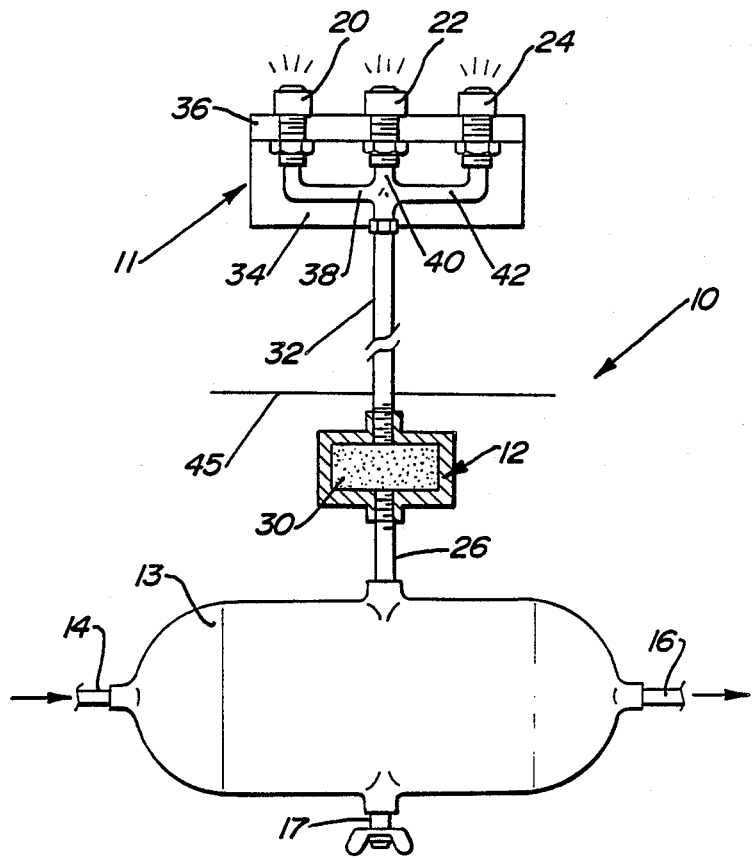

SENSOR PROTECTION FOR A COMPRESSED AIR TANK

BACKGROUND OF THE INVENTION

This invention in general relates to pressure sensors for use in combination with a compressed air tank, and more particularly, to a protection system that helps maintain proper operation of the sensors. In particular, this application discloses a sensor and protection system for use therewith that is attached to a compressed air tank for a large construction vehicle for removing moisture that may result in freezing, corrosion, or plugging of the sensor.

In modern construction vehicle applications, compressed air is used to operate several types of components. In these types of applications, it is preferable to provide a compressed air tank that can store a relatively large supply of compressed air for the several pneumatically actuated devices. For example, a modern construction vehicle will have several operations or features that will require compressed air in order to operate. Thus, a compressed air tank is normally provided that will supply air to the various items that require it.

A compressor normally intermittently charges the air tank until a preset pressure is reached, at which time the compressor may be disengaged. The tank is maintained at a preselected pressure until the various loads deplete air such that the pressure within the tank falls below a preset pressure, and the compressor is then reactivated to recharge the tank. In these prior devices, it is known to utilize various types of pressure sensors that monitor the pressure within the tank and act in various ways to either automatically shut off the compressor or signal an operator that a predetermined maximum pressure has been reached. In several of these prior art devices, the sensors are pneumatically operated, and the pressurized air within the tank acts directly upon a diaphragm portion of the sensor in order to actuate it.

Problems sometimes arise with these systems, particularly the ones that act to give a visual signal to an operator. In many of these environments, operators are required to do a number of operations and do not have time to closely check the status of the sensors. It is important that the operator has an indication that the pressure within the tank is approaching the preset maximum, and it is also important that the operator has an approximate idea of the pressure within the tank at any point in time. A numerical dial is not normally satisfactory for this purpose, since the operator may be remote from the location of the dial and also may lack the time to study the dial closely in order to make a reading.

A problem may arise with these types of pneumatic sensors due to vapor impurities within the air in the tank. In compressing air, water vapor will condense, and water droplets will form and travel along with the compressed air. Additionally, in a lubricated compressor, there is usually some oil entrained with the compressed air stream. This water or oil can contaminate the sensors, leading to freeze-ups, corrosion and plugging of the sensors. This is undesirable, since it may prevent normal operation of the sensors.

It is, therefore, an object of the present invention to provide a sensor and sensor protection system that will prevent moisture from reaching the sensor and will retain the sensor dry and properly operating.

Moreover, it is an object of this invention to achieve these characteristics with a sensor and sensor protection system that is inexpensive and requires relatively few moving parts.

These and other objects are addressed by the present invention.

SUMMARY OF THE INVENTION

In accordance with the present invention, a sensor assembly is disclosed that consists of a plurality of sensor elements, each having a distinct actuation point. By checking on the visual status of the different sensors, an operator may be able to make a quick determination of the pressure within the tank at any moment.

A porous water separating element is disposed in the line that leads from the pressure air tank to the sensor arrangement. This water separating element acts to remove any water or oil that may be entrained with the compressed air before it reaches the sensor arrangement.

The sensor arrangement consists of, for example, three sensor elements that each provide a visual indication when they are actuated. These sensor elements are well known in the art and provide a visual signal when they are exposed to a preset pressure. The sensor elements may be set to actuate at a distinct pressure, and thus by checking the status of the sensor elements, an operator can approximate the pressure within the tank at any given time. For instance, if the three sensor elements are set at 50 p.s.i., 100 p.s.i. and 150 p.s.i., and the status of the three sensors was that the 50 p.s.i. and the 100 p.s.i. sensors were actuated and the 150 p.s.i. sensor was not actuated, an operator could quickly determine that the pressure within the tank was somewhere between 100 and 150 p.s.i. An operator would be able to make this determination from a distance without having to spend any significant amount of time reading any dials or readouts.

In the disclosed embodiment, the sensors may consist of a diaphragm element that will move upwardly against spring pressure to contact a switch and light an actuation light. However, these type of sensors are not intended to be limiting, and any other types of sensors are contemplated including, for example, sensors that have a brightly colored flag that will mechanically pop up when the sensor is actuated.

The sensor arrangement further comprises a manifold body that has lines that will direct pressure from the air tank to the sensors. This manifold body is connected to a conduit that extends downwardly into the air pressure tank. A separation member is mounted in the conduit intermediate the manifold and the air pressure tank. The separation member has a porous separating member disposed therein that is formed of a material having good separation characteristics. In a the disclosed embodiment, a honeycombed, sintered bronze member is used. The manifold is mounted directly above the air tank, and the conduit extends downwardly into the air tank. Gravity will act to return any fluids that are in the conduit, the separating element, or even the manifold to the air tank when the compressor is disengaged.

The air tank is connected to a compressor which runs intermittently to charge it. A line extends from the air tank to the various loads requiring pneumatic pressure. Further, a drain is mounted in the bottom of the air tank which can be used to drain away water or oil when the compressor is stopped.

Therefore, the present invention provides a sensor and a sensor protection assembly that will allow an operator to visually obtain an approximate reading of the pressure within an air tank and at the same time will prevent the sensor from being contaminated by water or oil.

Other advantages and features of the present invention will be more fully understood from the detailed description of the invention, the appended claims and the drawing, which is briefly described hereinbelow.

BRIEF DESCRIPTION OF THE DRAWING

The drawing FIGURE illustrates a novel sensor and protection assembly for use with an air tank system.

DETAILED DESCRIPTION OF THE INVENTION

The air pressure tank system 10 of the present invention includes a sensor assembly 11 and a sensor protection assembly 12 which are illustrated in the sole FIGURE. As shown in the FIGURE, line 14 leads into the tank 13 from a compressor (not shown), and a line 16 leads from the high-pressure tank 13 to the various loads that the tank 13 is intended to service. A drain valve 17 is placed on the bottom of the tank and will act to allow draining of fluid from the bottom of the tank 13 when the system 10 is shut down.

The sensor assembly 11 consists of three sensors 20, 22, 24 which act to monitor the pressure within the tank 13. A conduit 26 extends from the air pressure tank 13 to the separation element 30. In the disclosed embodiment, the separation element 30 is a honeycombed, sintered bronze element; however, it is to be understood that other types of separation devices can be used. A pipe 32 extends from the top of the separation element 12 into a manifold 34 that forms part of the sensor assembly 11. The sensors 20, 22, 24 are mounted in a manifold top 36 that is attached to the manifold 34 and which together comprise the body of the sensor arrangement 11. Fluid pressure lines 38, 40, 42 are formed within the manifold body 34 and lead to the sensors 20, 22, 24, respectively. These fluid lines are of sufficient cross-section so as not to impede or restrict the flow of the pressurized air to the sensors.

The various members are located so that the sensor arrangement is mounted directly above the separation unit 12 which is located directly above the air tank 13. When the compressor (not shown) is running and air is conducted through pipe 14, the pressure within the air tank 13 is increased. Air is forced upwardly through pipe 26 into separator 12, through the porous plug 30, and then upwardly into the pipe 32 and into the sensor arrangement 11. The air is cooled and filtered by the porous plug 30 and water and oil vapors are removed from the air. In addition, some of the water or oil vapor is filtered out of the air by the conduits 26, 32. That is, although the porous plug 30 acts to effectively remove the majority of the vapor from the air, some of the vapor may escape through the porous plug 30 and continue upwardly into the conduit 32. The conduit 32 acts to effectively remove the remainder of the vapor that does pass through the porous plug 30, and thus, moisture will not reach the sensor arrangement 11. The vapor that is separated by the conduit 32 will return downwardly into the separation unit 12 and into the porous plug 30 when the compressor is disengaged. The fluid that has settled within the porous plug 30 will return down through the conduit 26 and back into the air tank 13 under the force of gravity. When the compressor has been off for a period of time, all the moisture within the system will move downwardly into the pressure tank 13, and it can be drained off by the drain valve 17. This could be done, for instance, at the end of the work day.

The disclosed system may be mounted, for example, on a large construction vehicle, such as a wheeled loader unit, that will have many uses for the high-pressure air. In a preferred embodiment of this invention, the sensor arrangement 11 is mounted above the cab floor 45 of the construction vehicle, and the separation unit 12 and the high-pressure tank 13 are mounted below the cab floor in line with the sensor unit 11. Since the sensor unit is mounted directly above the separator unit 12 and the pressure tank 13, gravity will act to return any separated fluids back into the air tank 13. The tank 13, separator 12 and manifold 34 are mounted such that a vertical line drawn through the point where the pipe 26 enters tank 13 will extend through the separator 12, the conduit 32 and into the point where conduit 32 enters the manifold 34.

It will be obvious to those skilled in the art that various other modifications could be made to the sensor assembly and protection device of the present invention without departing from the spirit and scope of the present invention, which is defined by the appended claims.

I claim:

1. A device for monitoring the pressure within a high-pressure tank that contains compressed gas, comprising:
    a pressure sensor unit that is operably connected to receive a portion of the compressed gas from the tank and monitor the pressure within the high-pressure tank;
    a fluid line interconnecting the high-pressure tank and said sensor unit;
    a vapor separation unit ;mounted in said fluid line;
    said sensor unit being mounted directly above said tank; and
    said fluid line and said separation unit being mounted between said sensor unit and said tank; and
    said separation unit comprises a porous plug that acts to cool and filter vapor from the compressed gas and said plug is formed of a sintered bronze material and is honeycombed.

2. A device as recited in claim 1, in which said sensor unit comprises plural sensor elements, each sensor element preset to be actuated at a distinct predetermined pressure, each of said sensor elements providing a signal when said predetermined pressure is reached whereby the provision of said plural sensors which are actuated at distinct pressures providing an operator the ability to estimate the pressure within the tank over a range of values.

3. An air tank system that comprises:
    an air tank;
    a first line leading from said air tank to a source of compressed air;
    a second line leading from said air tank to at least one load that will utilize compressed air from said air tank;
    a drain valve in said air tank;
    a sensing assembly;
    a third line leading from the air tank to a vapor separating unit, a fourth fluid line extending from the vapor separating unit to said sensing assembly;
    said air tank, said separating unit, and said sensing assembly being mounted along a common axis; and said separating unit comprising a porous, honeycombed bronze plug that acts to cool and separate water vapor from the compressed air.

4. A tank system as recited in claim 3 wherein said sensing assembly comprises plural sensor elements, each of said sensor elements providing an indication when a predetermined pressure is reached within said air tank, each of said sensor elements having a predetermined pressure actuation point which is different than the other sensor elements such that it is possible to observe the status of the sensors and determine an approximation of the pressure within the air tank.

* * * * *